United States Patent Office 3,069,459
Patented Dec. 18, 1962

3,069,459
MAKING ALKENYL ESTERS OF AROMATIC CARBOXYLIC ACIDS USING AMIDE PROMOTERS
Kwan Chung Tsou, Huntingdon Valley, Stanley R. Sandler, Philadelphia, and Alvin T. Astrup, Warminster, Pa., assignors to The Borden Company, New York, N.Y., a corporation of New Jersey
No Drawing. Filed May 12, 1961, Ser. No. 109,490
5 Claims. (Cl. 260—475)

This invention relates to a process of making alkenyl esters of aromatic carboxylic acids.

The invention is particularly useful in making the diallyl phthalates and will be first illustrated by description therewith.

For making such esters, there has been proposed heating an aqueous solution of sodium phthalate with allyl chloride under pressure and at relatively high temperature. The present invention provides a process by which this reaction is effected in controlled manner at ordinary pressures and at temperatures below 100° C. with continuous removal of one of the reaction products from the sphere of the reaction.

Briefly stated, the invention comprises heating the selected alkenyl halide with an alkali metal salt of the aromatic carboxylic acid that is to be represented in the alkenyl ester, in solution in a promoter of the reaction, the promoter being a solvent for both the reactants but a non-solvent for the product alkali metal halide.

The promoter used is a liquid at the temperature of reaction. While diluting the reactants, it brings them into intimate contact with each other in a solution of both and raises the boiling point of the alkenyl chloride. The promoter, we consider, loosens the bonding of chlorine in allyl chloride without causing any substantial hydrolysis to hydrogen chloride. In any case, the reaction occurs smoothly and at a satisfactory rate without the use of autoclave pressures or temperatures. Examples of suitable promoters that illustrate the class to be used are mono- and dimethyl and mono- and diethyl formamides and the corresponding acetamides.

The salt of the $C_7$-$C_{10}$ aromatic carboxylic acid that we use is any of the alkali metal salts, particularly sodium, potassium and lithium salts of such acids, examples of which are benzoic, pyromellitic, trimesic, prehnitic and the three isomeric phthalic acids. There is no advantage in using the salts of the more expensive alkali metals.

As the alkenyl halide as starting material we use any of the group consisting of allyl and methallyl chlorides, bromides and iodides. The corresponding fluorides may be used if the special effect of the fluoro compound is desired in the reaction.

As to proportions, we use at least approximately as much by weight of the liquid promoter as of the selected allyl halide, as for example 1–10 parts of the promoter for 1 of the alkenyl halide. Of the selected halide itself we use ordinarily at least the amount approximately equivalent to the alkali metal salt, so that the metal in this salt appears in the final reacted mixture as a precipitate of the alkali metal halide which is insoluble in the liquid promoter and any excess of the alkenyl chloride may be removed by distillation from the final ester product. An excess of either reactant may be used but a large excess of either is wasteful.

As to conditions of operation, atmospheric pressure is satisfactory and in fact is preferred. The temperatures at which the solution in the promoter is heated need not be above the boiling point of the solution at the prevailing pressure, as for example within the range of about 50°–80° C. and ordinarily 55°–75° C. The boiling point rises slowly as the reaction proceeds and the proportion of the unreacted allyl halide decreases. The boiling point becomes substantially constant and the precipitation of the alkali metal halide ceases when the reaction is completed.

The invention will be further illustrated by description in connection with the following specific examples. Here and elsewhere herein proportions are expressed as parts by weight except when specifically stated to the contrary.

Example 1

In to a glass lined metal reaction kettle equipped with agitator and reflux and down condensers there were introduced 1382 parts by weight (6.6 moles) of disodium isophthalate, 1515 parts (19.8 moles) of allyl chloride and about 5,000 parts of dimethyl formamide. The whole was stirred continuously and heated to the refluxing temperature which at the start was about 57° C. and rose to 70° C. where it became practically constant when no more white salt precipitated.

The reacted mixture including the by product sodium chloride which had settled from the liquid phase was filtered off. The filtrate was distilled, to remove the forerun of remaining allyl chloride, the receivers then switched, the temperature raised to distil out any remaining dimethyl formamide, the receivers then again changed, vacuum applied and the desired diallyl isophthalate distilled at a pressure of about 1–4 mm. of mercury and at temperatures of 120°–135° C.

The diallyl isophthalate so distilled is suitably washed with an aqueous alkali solution, such as a 10% solution of equal weights of sodium carbonate and sodium chloride in an amount to neutralize any small amount of acidity present. The washings are separated from the thus neutralized isophthalate, the alkali and salt solution being heavier and settling below the ester layer. The ester layer may be dried if desired although the proportion of water is at the most very small.

The final product was obtained with the yield of 82% of the theory calculated from the sodium isophthalate used. The index of refraction of the product was $n_D^{20}$ 1.5221.

The product so made is suitable for polymerization in making encapsulating composition; in cross-linking polyethylene and polyesters such as the alkyd ester type illustrated by glycerine phthalate and polyglycol esters of fumaric acid; and as an adhesive to be cured by being warmed with benzoyl peroxide or the like, the encapsulating, the cross-linking and the adhering being effected under conditions that are usual for such purposes.

In a modification of this example the vacuum distillation is omitted, it being not necessary for most uses of the product.

Example 2

The procedure and composition of Example 1 are used except that the isophthalate is replaced by the sodium orthophthalate and sodium terephthalate used separately and in turn and in the same proportion by weight.

Example 3

The procedure and composition of Example 1 are used except that the isophthalate is replaced by an equivalent amount, namely 3.3 moles of tetrasodium pyromellitate. The tetraallylpyromellitate so produced was a substantially non-volatile liquid of index of refraction $n_D^{20}$ 1.5265.

Example 4

The procedure and composition of Example 1 are used except that the disodium isophthalate is replaced in turn by equivalent amounts of sodium benzoate, trimesate, and prehnitate. The products so made are monoallyl benzoate, triallyl trimesate, and tetrallyl prehnitate.

Example 5

The procedure and composition of Example 1 are used except that the allyl chloride there used is replaced in turn by any one of the following materials in equimolecular proportions: allyl bromide, allyl iodide and methallyl chloride, bromide and iodide.

All of the esters made as described are useful for purposes for which corresponding allyl esters of the same acids have been used heretofore or for those applications stated above.

It will be understood that it is intended to cover all changes and modifications of the examples of the invention herein chosen for the purpose of illustration which do not constitute departures from the spirit and scope of the invention.

We claim:

1. The process of making an alkenyl ester which comprises forming a solution of an alkenyl halide selected from the group consisting of allyl and methallyl chlorides, bromides, and iodides and an alkali metal salt of the unsubstituted benzene carboxylic acid having 7–10 carbon atoms and 1–4 carboxyl groups to the molecule in a liquid reaction promoter selected from the group consisting of mono- and dimethyl formamides and acetamides and mono- and diethyl formamides and acetamides, heating the resulting solution at a temperature not above the refluxing temperature thereof until the alkali metal halide which precipitates as the by-product ceases to precipitate and then filtering out the said halide, the proportion of the alkenyl halide used being at least approximately equivalent to the said salt and the promoter being in amount at least approximately equal in weight to the said halide.

2. The process of claim 1, the said alkenyl halide being allyl chloride.

3. The process of claim 1, the said salt being an alkali metal phthalate having two atoms of alkali metal for 1 phthalate group.

4. The process of claim 2, the said salt being an alkali metal isophthalate.

5. The process of claim 1, the said salt being the sodium salt of an acid selected from the group consisting of benzoic, pyromellitic, trimesic, and prehnitic acids, the said salt being one that is soluble in the said liquid reaction promoter.

References Cited in the file of this patent

UNITED STATES PATENTS

| | | |
|---|---|---|
| 2,275,467 | Pollack et al. | Mar. 10, 1942 |
| 2,831,854 | Tucker et al. | Apr. 22, 1958 |
| 2,939,879 | De Benedictis | June 17, 1960 |

OTHER REFERENCES

Osipow et al.: Ind Eng. Chem., vol. 48, 1459–62 (1956).